(12) United States Patent
Björkengren et al.

(10) Patent No.: US 9,265,005 B2
(45) Date of Patent: Feb. 16, 2016

(54) SYSTEM AND METHOD OF OPTIMIZING THE THROTTLING OF STREAMING MEDIA BURST DATA TRANSMISSIONS

(75) Inventors: Ulf Christian Björkengren, Bjärred (SE); Göran Roth, Malmö (SE)

(73) Assignee: ST-Ericsson SA, Plan-les-Ouates (CH)

(*) Notice: Subject to any disclaimer, the term of this patent is extended or adjusted under 35 U.S.C. 154(b) by 944 days.

(21) Appl. No.: 13/271,609

(22) Filed: Oct. 12, 2011

(65) Prior Publication Data

US 2013/0094364 A1    Apr. 18, 2013

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 52/02 | (2009.01) |

(52) U.S. Cl.
CPC ...... *H04W 52/0283* (2013.01); *H04W 52/0232* (2013.01)

(58) Field of Classification Search
CPC .................................................. H04W 52/0232
USPC .......................................................... 370/236
See application file for complete search history.

(56) References Cited

U.S. PATENT DOCUMENTS

| | | | | |
|---|---|---|---|---|
| 5,914,945 | A * | 6/1999 | Abu-Amara et al. | 370/329 |
| 6,819,658 | B1 * | 11/2004 | Agarwal et al. | 370/316 |
| 2003/0190938 | A1 * | 10/2003 | Ganton | 455/574 |
| 2009/0069057 | A1 * | 3/2009 | Haartsen et al. | 455/574 |
| 2012/0281561 | A1 * | 11/2012 | Shukla et al. | 370/252 |

* cited by examiner

*Primary Examiner* — Shripal Khajuria
*Assistant Examiner* — Farhad Ali
(74) *Attorney, Agent, or Firm* — Coats & Bennett, PLLC

(57) ABSTRACT

Methods of throttling video streaming downloads in burst transmissions to a mobile device are driven by the network client. By knowing various input parameters such as the media bitrate, the current (average) network link bitrate, transceiver state timeout characteristics (e.g., inactivity timers), and power consumption information for various mobile device operating states, the network client can decide the proportion of each repeating burst interval duration to spend in an idle state. From a control parameter and the other input parameters, it can calculate the amount of media data it then needs to request in each burst transmission. Other calculations further inform this decision, such as the relative average power consumption (as compared to staying at a high activity state continuously).

31 Claims, 7 Drawing Sheets

SYSTEM AND METHOD OF OPTIMIZING THE THROTTLING OF STREAMING MEDIA BURST DATA TRANSMISSIONS

FIELD OF THE INVENTION

The present invention relates generally to wireless telecommunications, and in particular to a system and method of controlling HTTP streaming data transmissions to optimize parameters such as power consumption.

BACKGROUND

One popular application on modern "smartphones," such as Android® devices and iPhones®, is rendering media such as audio/video. The HTTP streaming specifications—including progressive download, 3GPP adaptive HTTP streaming, MPEG adaptive HTTP streaming, and Apple® HTTP streaming—do not specify details on how the client or server should regulate the download bandwidth during the download session. One straightforward alternative is to download the entire session using the maximum bandwidth, and store the content in a buffer on the mobile device. Alternatively, if sufficient memory is not available, the mobile device may fill a download buffer and then download data at the rate it is "consumed," or rendered to the screen and speaker.

In practice, however, both approaches exhibit deficiencies. If an entire unit of media content is downloaded and buffered, radio resources in the downlink are wasted if the user only watches part of the media, and the rest is discarded. Thus, a streaming strategy may make more efficient use of radio resources by only downloading data as it is consumed. In practice, however, this may maintain the mobile device in a high activity state, in which it consumes significant power, more quickly depleting batteries.

For example, Android (OpenCore) has a small Media Reception Buffer, about 2.6 MB. The streaming pattern of an Android device is thus a large startup burst which quickly fills the buffer, followed by a regular succession of smaller bursts in an attempt to keep the buffer full. Because of timeout restrictions on transitions between transceiver states, the result is that Android devices remain in an active state (e.g., cell-DCH) throughout much of the streaming session, in which they consume the most power.

In contrast, the iPhone Media Receive Buffer is much larger, about 32 MB. Once the buffer is full, the iPhone throttles video data reception by frequently closing the TCP connection, and restarting with a byte range request to the server as the buffer depletes. Because an active connection to the wireless network is periodically closed, the iPhone may spend more time in an idle state (e.g., URA-pch), consuming less power and prolonging battery life. However, as mentioned above, if a user watches only a few seconds of the media, valuable radio resources may have been wasted in filling the large buffer.

In general, characteristics of the mobile device and network should be taken into account in selecting a streaming throttling strategy, to avoid excessive power consumption, network signaling, and network load.

Analysis of these parameters reveals that many of them have non-linear relationships. This means that small variations in one parameter can lead to large variations of another, or vice versa. Only by understanding these relationships is it possible to select an optimal operating point for a given parameter (e.g., power consumption). Furthermore, understanding the non-linear relationships allows one to avoid operating points where some parameter is set to less desired values without any greater gain on other parameters.

SUMMARY

Methods of throttling video streaming downloads to a mobile device described herein are driven by the network client. By knowing various input parameters such as the media bitrate, the current (average) network link bitrate, transceiver state timeout characteristics (e.g., inactivity timers), and power consumption information for various mobile device operating states, the network client can decide the proportion of each repeating burst transmission duration to spend in an idle state. From this control parameter and the other input parameters, it can calculate the amount of media data it should request in each burst. Other calculations further inform this decision, such as the relative average power consumption (as compared to staying at a high activity state continuously).

One embodiment relates to a method of controlling the amount of streaming media data downloaded via a wireless network to a mobile device per burst transmission, the mobile device operating in a high activity state during the burst transmission data transfer, a low activity state following the high activity state during which the mobile device may exchange control signaling with the network, and an idle state following the low activity state during which no signaling occurs. The values of media input parameters, network input parameters, and per-state mobile device power consumption input parameters are ascertained, and a control parameter value is selected. A plurality of output parameters is calculated by applying one or more non-linear equations to the input parameters, the output parameters including an amount of data to download per burst transmission. The output parameters are evaluated. If the output parameters are acceptable, the mobile device negotiates with the network to download the calculated amount of data per burst transmission. If the output parameters are not acceptable, the value of one or more input parameters or the control parameter are altered, and the calculating and evaluating steps are repeated.

Another embodiment relates to a mobile device operative to receive and render streaming media content from a wireless network. The mobile device includes a transceiver operative to receive media data in burst transmissions, each within a burst interval. The mobile device also includes memory comprising a media buffer operative to store media data. The mobile device further includes a controller operative to operate the mobile device in a high activity state during the burst transmission data transfer, a low activity state following the high activity state during which the mobile device may exchange control signaling with the network, and an idle state following the low activity state during which no signaling occurs. The controller is also operative to execute one or more functional modules operative to ascertain the values of media input parameters, network input parameters, and per-state mobile device power consumption input parameters; select a control parameter value; calculate, by applying one or more non-linear equations to the input parameters, a plurality of output parameters, including an amount of data to download per burst transmission; and evaluate the output parameters. If the output parameters are acceptable, one or more functional modules are operative to negotiate with the network to download the calculated amount of data per burst transmission. If the output parameters are not acceptable, one or more functional modules are operative to alter the value of one or more input parameters or the control parameter, and repeat the calculation and evaluation.

DETAILED DESCRIPTION

Figure 1:
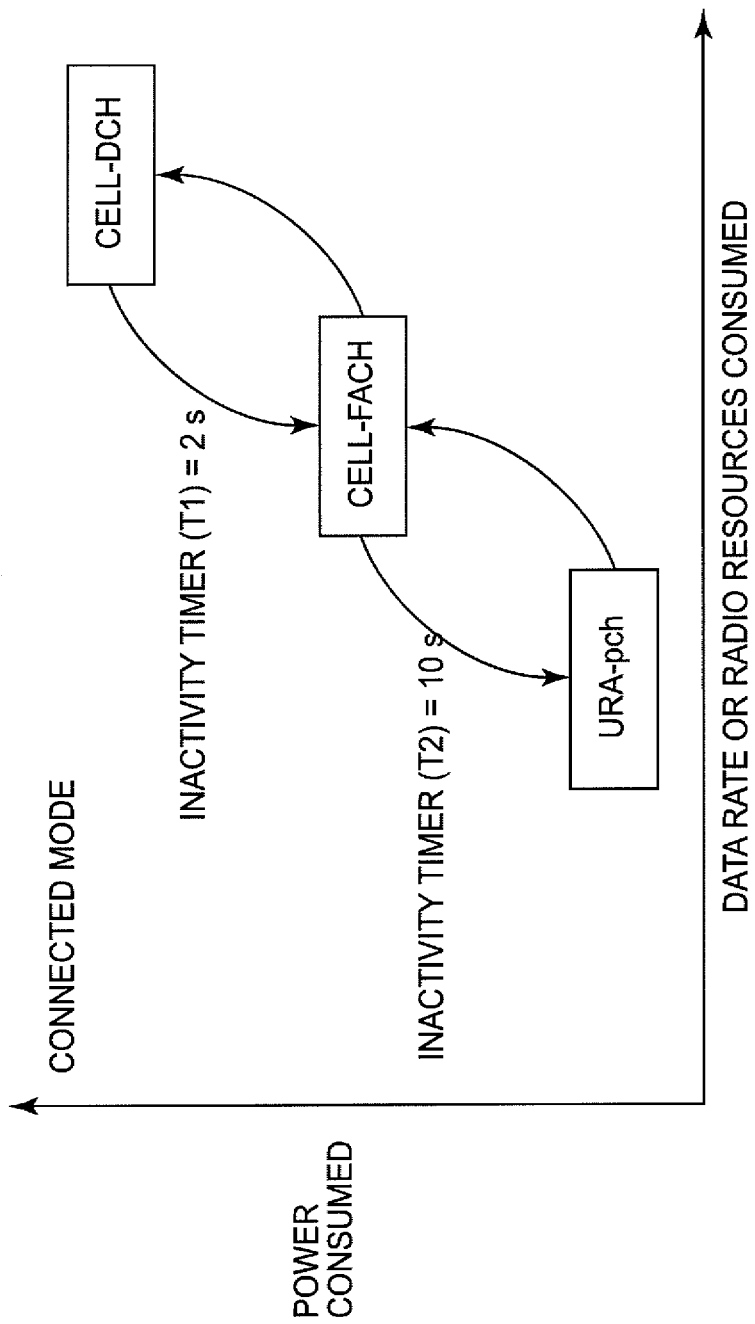
FIG. 1 is a diagram of 3GPP Connected Mode states for a mobile device.

Third Generation Partnership Project (3GPP) specifications (e.g., TS 25.331) define discrete Radio Resource Control (RRC) states for a mobile device in Connected Mode. Some of these states, and their relationship respecting data rate or radio resources utilized vs. power consumed, are depicted in FIG. 1. Transitions to/from states in other modes (e.g., Idle Mode) are not depicted.

The Cell-DCH state is characterized by a dedicated physical channel being allocated to the mobile device in both uplink and downlink, and dedicated and/or shared transport channels available for use by the mobile device. Transfers of media data from the network to the mobile device occur in the Cell-DCH state, in burst transmissions. To prevent rapid oscillations between states, an inactivity timer (T1) prevents transitions out of the Cell-DCH state for a predetermined duration following the completion of any data transfer. A typical value for T1 is 2 sec. The Cell-DCH state is an example of a mobile device state referred to herein as a "high activity state." During a high activity state, the mobile device may engage in data transfers with the network. The mobile device thus achieves the greatest data rate, and concomitantly utilizes the greatest quantity of network resources in the high activity state. It also consumes the most mobile device battery power in this state.

The Cell-FACH state is characterized by the lack of a dedicated physical channel being allocated to the mobile device. Rather, the mobile device continuously monitors the Forward Access CHannel (FACH) in the downlink. The mobile device is assigned a default common or shared transport channel in the uplink (e.g., Random Access CHannel, or RACH), which it may utilize according to the access procedure for that channel. The Cell-FACH state also has an inactivity timer (T1) for transitions out of the state, a typical value for which is 10 sec. The Cell-FACH state is an example of a mobile device state referred to herein as a "low activity state." During a low activity state, the mobile device may exchange control signaling with the network, but does not engage in user data transfers. In this state, the mobile device utilizes a relatively small quantity of network resources, and consumes less battery power than in the high activity state.

The URA-pch state is characterized by the lack of a dedicated physical channel being allocated to the mobile device, and no uplink activity is possible in this state. The mobile device selects a Paging CHannel (PCH), and uses discontinuous reception (DRX) for monitoring the selected PCH via an associated Paging Indicator CHannel (PICH). The URA-pch state is an example of a mobile device state referred to herein as an "idle state". During an idle state, no signaling occurs between the mobile device and the network (other than cell-wide pages by the network). In this state, the mobile device utilizes a minimum quantity of network resources, and consumes the minimum battery power, as compared to any other Connected Mode state.

Figure 2:
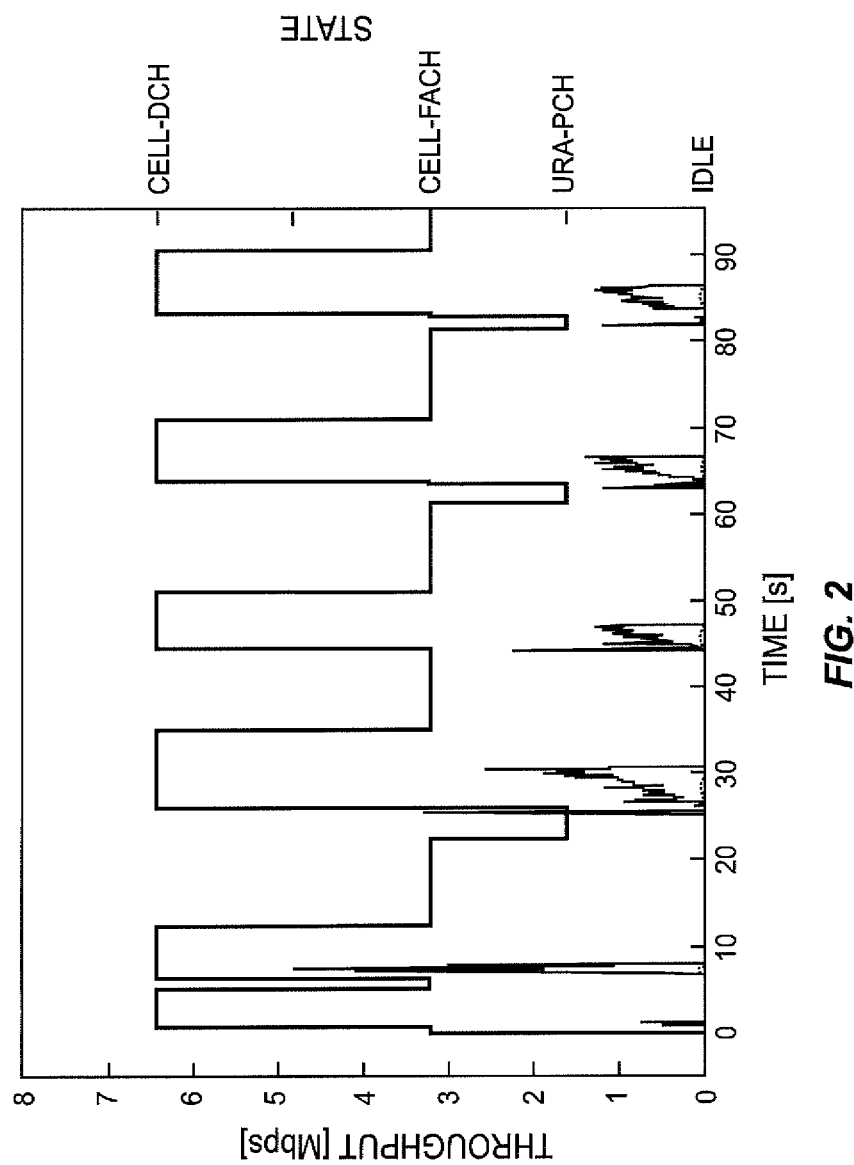
FIG. 2 is a representative graph of media data download burst transmissions and mobile device states.
Figure 3:
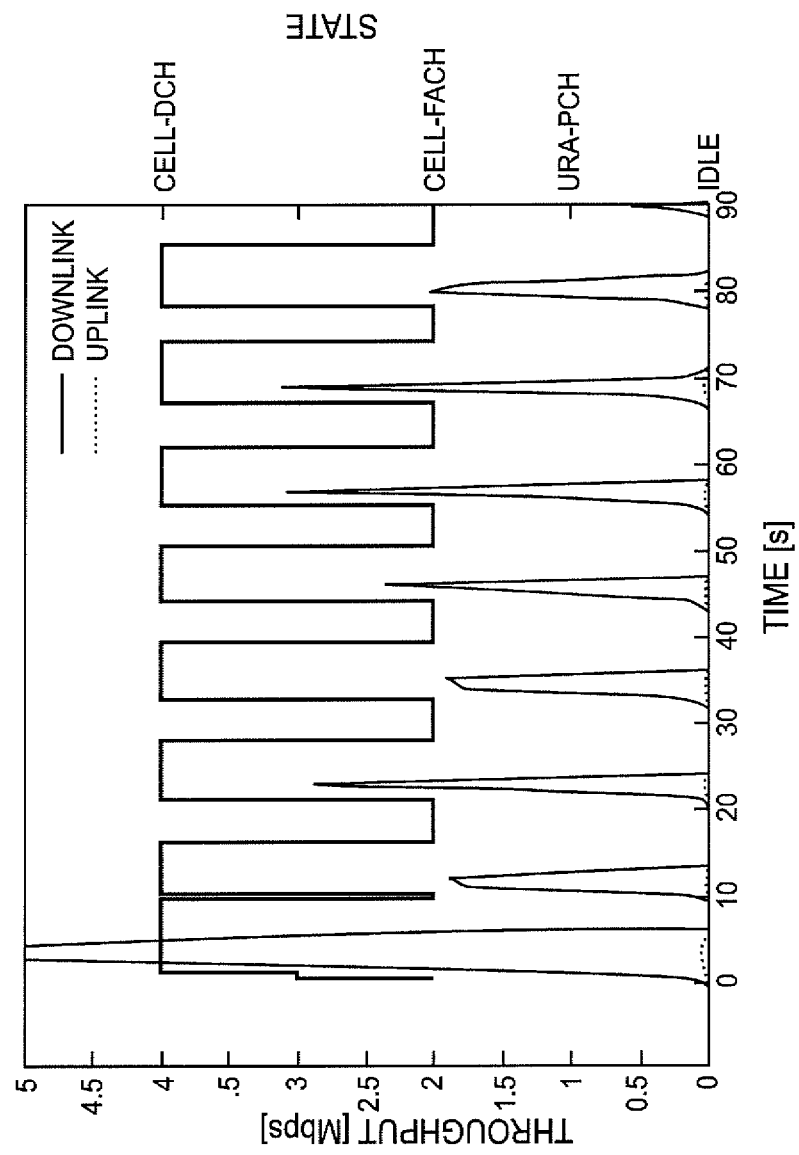
FIG. 3 is another representative graph of media data download burst transmissions and mobile device states.

FIG. 2 depicts representative media data bursts from a network to a mobile device, and the concomitant state of the mobile device, for a particular configuration of mobile device and download type (bitrate, quality, and the like). A relatively large initial burst fills a buffer in the mobile device, and subsequent, smaller bursts refill the buffer at generally regular intervals as the media data is consumed, or rendered to a user. The mobile device spends most of the time transitioning between the high activity state and low activity state, with only brief excursions to the idle state. FIG. 3 depicts downlink media data bursts to another mobile device, under different conditions. In this case, the data bursts are more frequent, and the mobile device never enters the idle state. If power consumption is a parameter along which the burst transmission parameters are to be optimized, in general, the mobile device should spend the least possible time in the high activity state, and the most possible time in the idle state.

Figure 4:
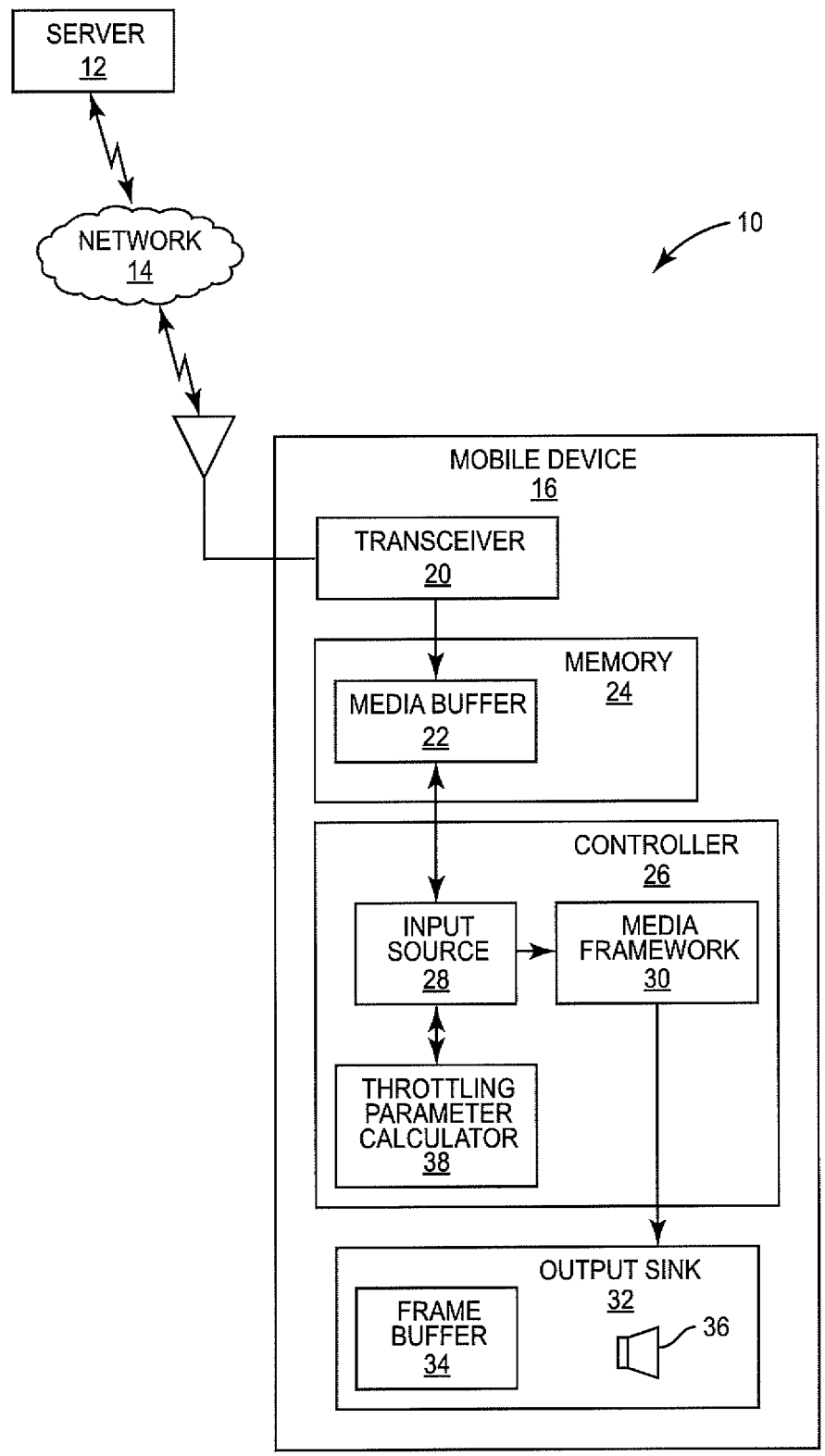
FIG. 4 is a functional block diagram of a streaming media download environment and the relevant structure of a mobile device.

FIG. 4 depicts a functional block diagram of a media download environment 10. A media server 12 transmits media data in burst transmissions over a wireless network 14 to a mobile device 16, according to the network protocol. The burst transmission is received at an antenna 18, processed by a transceiver 20, and stored to a media buffer 22 in memory 24. A controller 26, such a processor, Digital Signal Processor (DSP), or the like, executes software (also stored in memory 24) to implement an input source 28, media framework 30, and a throttling parameter calculator 38 as part of a streaming media reception and rendering application.

The input source 28 receives the media data from the media buffer 22, and controls the parameters of exchange with the server 12, such as the burst size and duration, byte ranges into a media file, and the like. The input source 28 implementations may be different for different sources, such as an HTTP progressive download node, a 3GPP Adaptive HTTP streaming node, an Apple HTTP Live Streaming node, and the like—these are all represented in FIG. 4 by a generic input source 28. The received media data is passed to a media framework 30, which processes the data and renders it to output sinks 32, such as a video frame buffer 34 for rendering to a display screen, and one or more speakers 36. One example of a media framework having different input sources 28 is the Stagefright® function in Android.

According to embodiments of the present invention, a throttling parameter calculator 38 communicates with the media input source 28, and calculates data transfer parameters, such as burst size, to optimize one or more parameters. The media input source 28 provides media input parameters to the throttling parameter calculator 38, such as the media bitrate. The input source 28 additionally provides network input parameters, such as the radio link bitrate. The input source 28 further provides mobile device 16 per-state power consumption parameters, such as the average power consumption in each of the high activity, low activity, and idle states, as well as parameters related to the duration(s) the mobile device 16 spends in each state, such as the state inactivity timer values T1 and T2. The media input source 28 also provides a control parameter, such as the desired percentage of time spent in the idle state, which is one measure of the minimization of power consumption.

The throttling parameter calculator 38 applies non-linear equations to these input parameters, and returns output parameters, including the amount of media data to be downloaded in each burst transmission, the burst interval, the relative average power level (in relation to continuous full power), and the like. The input source 28 evaluates the output parameters, such as by comparing them to preconfigured values, user input, and the like. The input source 28 may then modify input parameters and request new calculations from the throttling parameter calculator 38, or find the output parameter values acceptable. The input source 28 then negotiates with the server 12 to set the size of each media data download burst transmission to the calculated amount.

For protocols downloading media data in segments, each with a fixed amount of data, the input source 28 has two possibilities. One is to request an integer number of data segments that sums to the closest to, but less than, the calculated amount. The other is to request the smallest number of segments that sums to a value larger than the calculated amount, and then in the download of the last segment, the input source 28 makes a byte range request to the server 12, to only download a part of this segment. Then at the next burst interval, the remaining part of this segment is downloaded using another byte range request, in addition to subsequent data segments.

Figure 5:
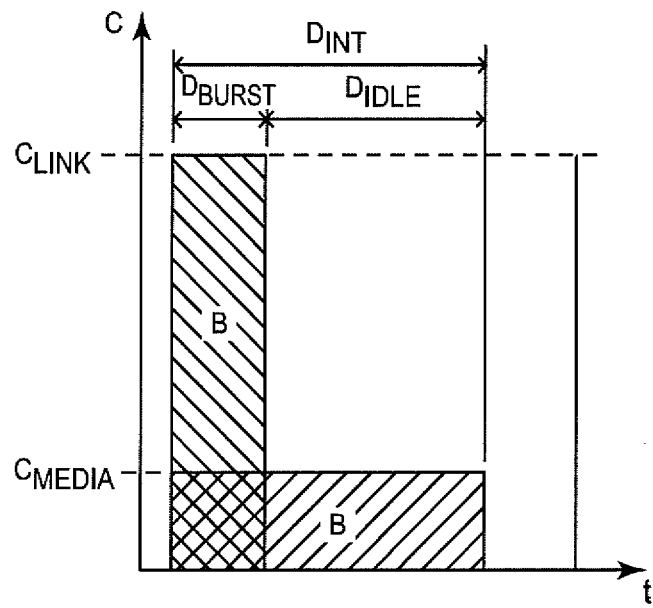
FIG. 5 is a graph depicting burst data transmission timing parameters.

FIG. 5 depicts the amount of data B to be downloaded to a mobile device 16 over a burst interval duration $D_{int}$. B is also the minimum media data buffer 22 size (BufSize) required in the mobile device 16 for continuous playback. Over the burst interval duration $D_{int}$, the amount of data B is determined by the media bitrate $C_{media}$—that is, $B=C_{media} \cdot D_{int}$. This data B may be downloaded in a lesser duration, at a higher bitrate, and buffered in the mobile device 16, leaving a duration $D_{idle}$ during which no data is transferred, and in which the mobile device 16 may enter the idle state for at least part of the time, to reduce power consumption. As depicted in FIG. 5, if the data is transferred at the maximum wireless radio link bitrate $C_{link}$, the data transfer duration $D_{burst}$ is minimized and the idle duration $D_{idle}$ is maximized.

As used herein, the term "burst transmission" refers to a data transfer operation having a duration $D_{int}$, during which data is transferred in burst mode for a duration $D_{burst}$, also referred to as a "burst transmission data transfer," where $D_{burst} \leq D_{int}$.

Figure 6:
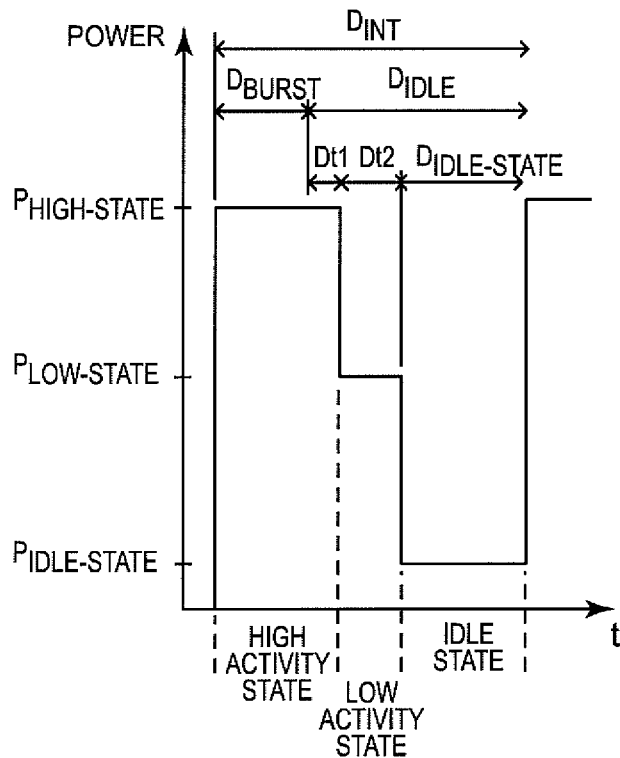
FIG. 6 is a graph depicting mobile device state transitions during a burst data transmission.

FIG. 6 depicts the maximum actual time the mobile device 16 may be in the idle state, denoted as $D_{idle\text{-}state}$, and the power consumption level associated with each state. With reference to FIGS. 1 and 6, following the termination of the burst transmission data transfer (e.g., at bitrate $C_{link}$), the mobile device 16 remains in the high activity state for the duration $D_{t1}$ of the high activity state timeout T1, which is typically 2 sec. The mobile device 16 then enters the low activity state. Assuming the network 14 does not page the mobile device 16, it must remain in the low activity state for at least the duration $D_{t2}$ of the low activity state timeout T2, which is typically 10 sec. The mobile device 16 may then enter the idle state, and remain there for the duration $D_{idle\text{-}state}$, until another burst transmission is required.

Note that the depiction of state transitions in FIG. 1 does not hold if the client implements issuing of Fast dormancy requests to the network 14. In this case, the network 14 will directly transfer the mobile device 16 from the high activity state to the idle state. In this case, the inventive methods and calculations disclosed herein still apply, with the following adjustments: $D_{t1}$ is set to the (estimated or measured) latency from the request being issued to idle state transition, and $D_2$ is set to zero. With these adjustments, the model disclosed herein can be used also for the Fast dormancy case.

Given these parameter definitions, the following relationships are apparent from FIGS. 5 and 6:

$$D_{int}=D_{burst}+D_{idle} \tag{1}$$

$$B=\text{BufSize}=C_{media} \cdot D_{int} \tag{2}$$

$$B=\text{BufSize}=C_{link} \cdot D_{burst} \tag{3}$$

That is, the areas B under the two curves of FIG. 5 are equal. Combining equations (2) and (3) yields:

$$C_{link} \cdot D_{burst} = C_{media} \cdot D_{int} \tag{4}$$

$$D_{burst} = \frac{C_{media} \cdot D_{int}}{C_{link}}$$

$$D_{burst} = D_{int}\left(\frac{C_{media}}{C_{link}}\right)$$

Combining this result with equation (1):

$$D_{int} = D_{int}\left(\frac{C_{media}}{C_{link}}\right) + D_{idle} \tag{5}$$

$$D_{idle} = D_{int} - D_{int}\left(\frac{C_{media}}{C_{link}}\right)$$

$$D_{idle} = D_{int}\left(1 - \frac{C_{media}}{C_{link}}\right)$$

From FIG. 6, the maximum actual time spent in the idle state $D_{idle\text{-}state}$ is:

$$D_{idle\text{-}state}=D_{idle}-D_{t1}-D_{t2}=D_{idle}-(D_{t1}+D_{t2}) \tag{6}$$

Note that in the case of Fast Dormancy, $D_{t2}$ is set to zero, and $D_{t1}$ is set to the Signaling Connection Release Indication (SCRI) request delay.

For optimal power savings, it is desired that $$D_{idle} \geq \geq D_{t1}+D_{t2}, \tag{7}$$

or $$D_{idle}=K(D_{t1}+D_{t2}) \text{ where } K\geq\geq 1. \tag{8}$$

hence, $$K = \frac{D_{idle}}{D_{t1} + D_{t2}}.$$

Equating the two expressions of $D_{idle}$ from equations (5) and (8), $$D_{int}\left(1 - \frac{C_{media}}{C_{link}}\right) = K(D_{t1} + D_{t2}) \tag{9}$$

$$D_{int} = \frac{K(D_{t1}+D_{t2})}{\left(1-\frac{C_{media}}{C_{link}}\right)} = \frac{K(D_{t1}+D_{t2})}{\left(\frac{C_{link}}{C_{link}} - \frac{C_{media}}{C_{link}}\right)} = \frac{K(D_{t1}+D_{t2})}{\left(\frac{C_{link}-C_{media}}{C_{link}}\right)}$$

$$D_{int} = K(D_{t1}+D_{t2}) \cdot \left(\frac{C_{link}}{C_{link}-C_{media}}\right) \quad (10)$$

From equations (5) and (10), the portion of the burst interval not spent transferring data is:

$$\frac{D_{idle}}{D_{int}} = \frac{D_{idle}}{\frac{D_{idle}}{\left(1-\frac{C_{media}}{C_{link}}\right)}} = \left(1-\frac{C_{media}}{C_{link}}\right). \quad (11)$$

The portion of the burst interval not spent transferring data that the mobile device 16 can spend in the idle state is, from equations (6) and (8):

$$\frac{D_{idle-state}}{D_{idle}} = \frac{D_{idle}-(D_{t1}+D_{t2})}{D_{idle}} \quad (12)$$

$$= \frac{\frac{D_{idle}-(D_{t1}+D_{t2})}{(D_{t1}+D_{t2})}}{\frac{D_{idle}}{(D_{t1}+D_{t2})}}$$

$$= \frac{\frac{D_{idle}}{(D_{t1}+D_{t2})} - 1}{\frac{D_{idle}}{(D_{t1}+D_{t2})}}$$

$$= \frac{K-1}{K}.$$

Figure 7:
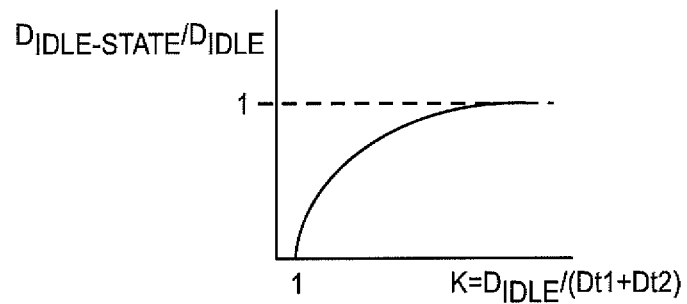
FIG. 7 is a graph of a first non-linear relation between parameters.

FIG. 7 depicts a graph of the ratio $$\frac{D_{idle-state}}{D_{idle}}$$

as a function of K. The graph is non-linear, and asymptotically approaches 1 for large values of K—that is, the time the mobile device 16 can spend in the idle state approaches the network idle time as the network idle time grows much larger than the high and low activity state timeout values.

Figure 8:
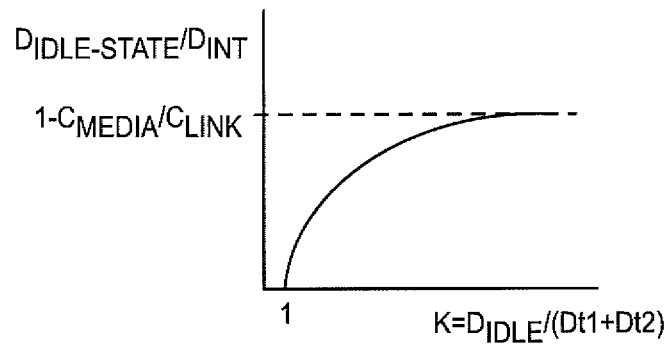
FIG. 8 is a graph of a second non-linear relation between parameters.

FIG. 8 depicts a graph of the ratio $$\frac{D_{idle-state}}{D_{int}}$$

as a function of K. This graph is also non-linear, and asymptotically approaches $$\left(1-\frac{C_{media}}{C_{link}}\right)$$

for large values of K. That is, the time the mobile device 16 can spend in the idle state approaches a certain fraction of the burst interval as the network idle time grows much larger than the high and low activity state timeout values. That fraction is determined by the ratio of media bitrate to available link bitrate (the idle state time approaches the interval if the media bitrate is much less than the link bitrate, meaning the burst time can be very short).

Figure 9:
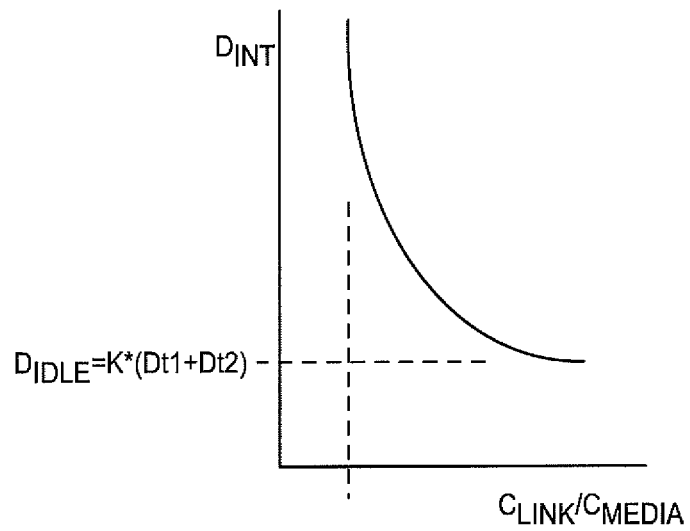
FIG. 9 is a graph of a third non-linear relation between parameters.

FIG. 9 depicts a graph of the burst interval duration as a function of the ratio of link to media bitrates. This graph is also non-linear. As the media bitrate approaches the available link bitrate, the burst interval increases (the network 14 cannot deliver significantly more data than the immediate needs of the media framework 30). The ratio $$\frac{C_{link}}{C_{media}}$$

cannot fall below 1, or the network 14 would be incapable of delivering the media. If the network 14 can deliver far greater bandwidth than the media framework 30 demands, the burst interval asymptotically approaches $D_{idle}$, as the time $D_{burst}$ required for the data transfer shrinks.

Also of interest, and calculated by the throttling parameter calculator 38, are the average power consumption and relative power consumption. The average power consumption is defined as:

$$P_{avg} = \frac{\left(P_{high-state}D_{high-state} + P_{low-state}D_{low-state} + P_{idle-state}D_{idle-state}\right)}{D_{int}}, \quad (13)$$

where $P_{high-state}$, $P_{low-state}$, and $P_{idle-state}$ are the average power consumption when the mobile device 16 is in the high activity state, low activity state, and idle state, respectively, and $D_{high-state}$, $D_{low-state}$, and $D_{idle-state}$ are the durations the mobile device 16 is in the high activity state, low activity state, and idle state, respectively. See FIG. 6.

The relative power consumption is defined as:

$$P_{rel} = \frac{P_{avg}}{P_{high-state}}. \quad (14)$$

The relative power consumption is the ratio of the average power consumption to the power consumption that would occur if the mobile device 16 were to remain in the high activity state throughout the burst interval (i.e., the worst case, from a power consumption viewpoint).

Further calculations, exploring the maximum and minimum values of $P_{rel}$, reveal that it may also be expressed as:

$$P_{rel} = P_{rel-max} - \left(\frac{D_{idle-state}}{D_{idle}}\right)(P_{rel-max}-P_{rel-min}), \quad (15)$$

where $P_{rel-max}$ is the relative average power consumption for $$\frac{D_{idle-state}}{D_{idle}} = 0,$$

and $P_{rel-min}$ is the relative average power consumption as $$\frac{D_{idle-state}}{D_{idle}}$$

approaches 1.

Although these equations reveal relationships between the network parameters, they do not directly indicate how the burst size should be selected. Possible control parameters, and/or areas to attempt optimization, include mobile device 16 power consumption, the minimum required mobile device 16 media data buffer 22, and the network loading. All of these are interrelated in complex ways.

Figure 10:
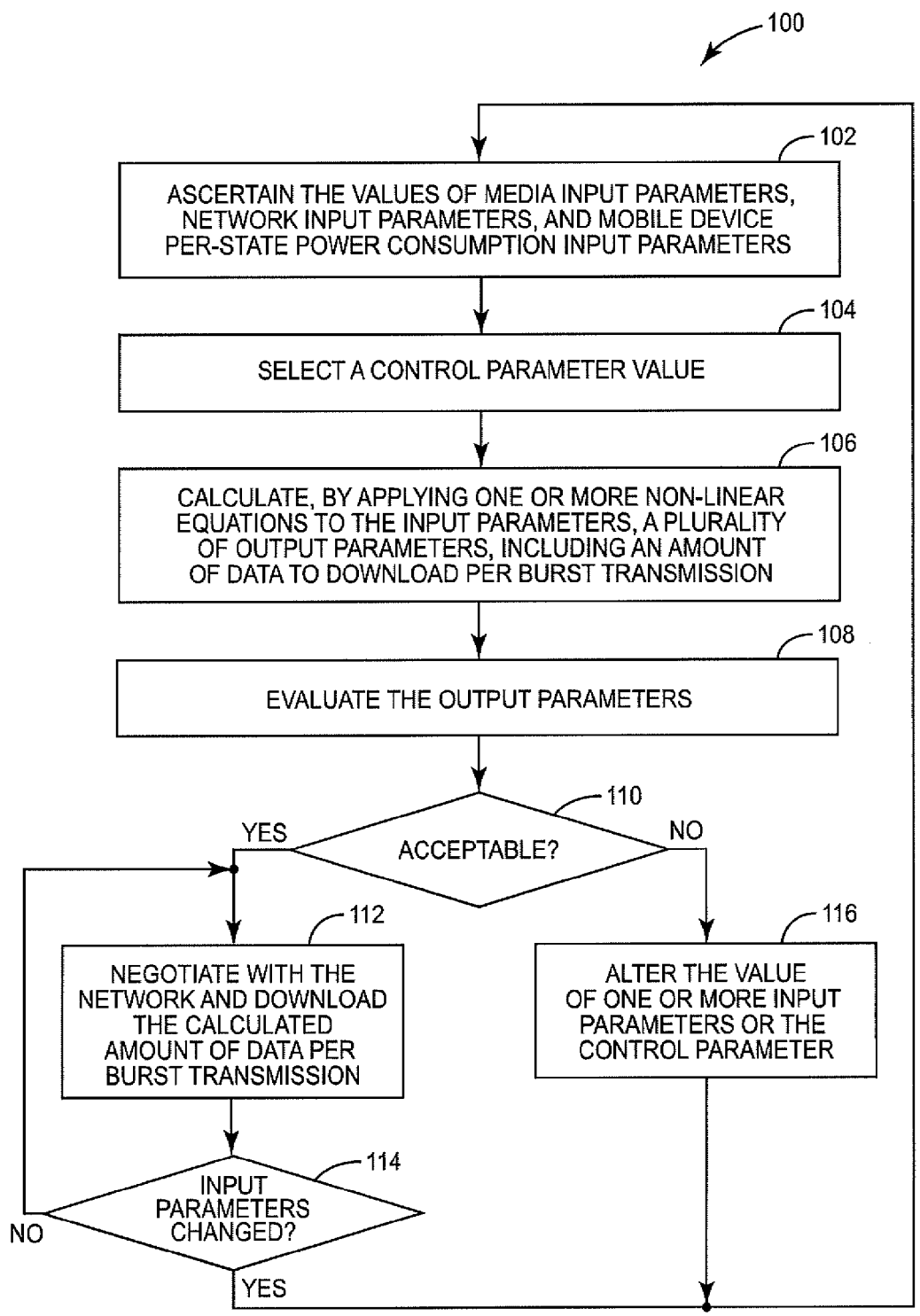
FIG. 10 is a flow diagram of a method of controlling the amount of streaming media data downloaded via a wireless network to a mobile device per burst transmission.

FIG. 10 depicts a method 100 of determining the burst size for a media download to a mobile device 16. The method is performed by the input source 28 and throttling parameter calculator 38 operating together. Initially, the input source 28 ascertains values for one or more media input parameters (e.g., $C_{media}$), one or more network input parameters (e.g., $C_{link}$), and one or more mobile device 16 per-state power consumption input parameters (e.g., $P_{high}$, $P_{low}$, and $P_{idle-state}$) (block 102). The input source 28 may ascertain additional input parameters, such as $D_{t1}$, and $D_{t2}$. These input parameter values may be preconfigured, measured, input by users, obtained dynamically from the network 14, or ascertained in any other manner.

The input source 28 also selects a desired value for a control parameter (e.g., $$\frac{D_{idle-state}}{D_{idle}})$$

(block 104). The control parameter $$\frac{D_{idle-state}}{D_{idle}}$$

is chosen, as it is reasonably intuitive to understand the situation as the ratio $$\frac{D_{idle-state}}{D_{idle}}$$

moves towards its boundaries [0 . . . 1], and to select a desired ratio.

Based on these inputs, the throttling parameter calculator 38 calculates, by applying one or more non-linear equations to the input parameters, a plurality of output parameters, including an amount of data to download per burst transmission, BufSize (block 106). BufSize is the minimum required size of the media data buffer 22 in the mobile device 16. The media data buffer 22 is allocated from available memory 24 in the mobile device 16, and BufSize should be kept small to conserve resources.

Other output parameters calculated may include the burst interval duration $D_{int}$ and the relative power $P_{rel}$. $D_{int}$ is of particular interest in live streaming scenarios, to keep the latency within acceptable limits. $D_{int}$ should be kept relatively short in non-live scenarios, to reduce wasted bandwidth if a user kills the session. $P_{rel}$ is the ratio of the average actual power consumption (in the various states) to the power consumption that would occur if the mobile device 16 were to remain in the high activity state throughout the burst interval, and is a measure of power consumption performance relative to worst case. The calculated parameters $D_{int}$ and BufSize have a non-linear relationship to the control parameter $$\frac{D_{idle-state}}{D_{idle}},$$

while $P_{rel}$ has a linear relationship.

The input source 28 then evaluates the calculated output parameters (block 108). The evaluation may comprise comparing the parameter values to predetermined values or ranges, or predetermined relationships between values of these parameters. Alternatively, the evaluation may be performed by providing information to a user and prompting for input, or by transmitting the values to the server 12 (or other network 14 node) and receiving guidance. Regardless of the method of evaluation, if the calculated parameters are acceptable (block 110), they are utilized to negotiate the media data burst transmissions with the server 12 (block 112), and the input parameters are monitored to detect any change (block 114), which would prompt re-running the calculations (blocks 102-110). If the calculated parameters are not acceptable (block 110), one or more input parameter values are altered (block 116), and the throttling parameter calculator 38 calculates new output parameter values (blocks 102-110). In many scenarios, $D_{int}$ and BufSize have their most desired values toward one end of the input parameter range, while $P_{rel}$ has its most desired value toward the other end of the range. Hence, optimizing the output parameters is a non-trivial problem, and numerous iterations of the method 100 are likely to be required.

The input source 28 and throttling parameter calculator 38 may be implemented as state machines in hardware or programmable logic and appropriate firmware; as software modules stored on machine-readable media such as memory 24 and executed on a controller 26, such as a processor or Digital Signal Processor (DSP) (as depicted in FIG. 4); or any combination thereof. Although described herein as calculations performed by a throttling parameter calculator 38 based on inputs ascertained by an input source 28, these are not limitations of the present invention. In general, a single functional module may perform all recited method steps. Alternatively, the steps may be performed by separate modules in divisions other than as input source 28 and throttling parameter calculator 38. As discussed above, some steps, such as evaluating the output parameters, may comprise consultation with other entities, such as a user, media server 12, or other network 14 node.

If the non-linear relationships among network, media, and power consumption parameters are not taken into account when calculating media download throttling parameters, it is easy to end up in operating points where a further small change in one or more input parameters could yield a large improvement on an output parameter, or where a large (desired) change of the operating point (input parameters) would only yield a small (undesired) change in one or more output parameters. On the other hand, when the non-linear nature of these relationships is taken into account, it is possible to select an operating point where the selection of the different parameters can be "weighed" against each other, to achieve an overall optimization along a desired parameter (such as power consumption).

Furthermore, with the method 100 disclosed herein, if network or media parameters change dynamically, the operating point can be recalculated and moved accordingly, to maintain a decided optimization strategy. In live streaming use cases, this dynamic adjustment can be used to adjust the "real time delay" that different selectable media qualities will yield (in adaptive streaming, several stream alternatives are typically available). Also, in live streaming use cases, the dynamic adjustment can be used to find a compromise between power consumption and "real time delay," which can be of interest, for example, in situations where the mobile device 16 may be at risk of running out of power before the streaming session reaches its end.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method performed by a mobile device of controlling an amount of streaming media data downloaded via a wireless network to a mobile device per burst transmission, the mobile device operating in a high activity state during the burst transmission data transfer, a low activity state following the high activity state during which the mobile device may exchange control signaling with the network, and an idle state following the low activity state during which no signaling occurs, the method comprising:
   ascertaining values of input parameters, wherein the input parameters include a media input parameter, a network input parameter, and a per-state mobile device power consumption input parameter;
   selecting a value for a control parameter that is related to a proportion of time that the mobile device is in the idle state during a burst transmission;
   calculating, by applying one or more non-linear equations associated with the control parameter to the input parameters, an output parameter using the value of the control parameter, wherein the output parameter includes an amount of data to download per burst transmission during the high activity state of the mobile device to maintain continuous playback of the streaming media;
   evaluating the output parameter includes comparing a value of the output parameter to a predetermined value or a predetermined range, or a relationship between values of the output parameter;
   if the output parameter is acceptable, negotiating with the network to download the calculated amount of data per burst transmission during the high activity state of the mobile device to maintain the continuous playback of the streaming media; and
   if the output parameter is not acceptable, altering the value of one or more input parameters or the control parameter, and repeating the calculating and evaluating steps.

2. The method of claim 1 further comprising:
   monitoring the input parameters; and
   if one or more input parameters change, repeating the method steps.

3. The method of claim 1 wherein the output parameters further includes a burst interval duration and a power consumption indication.

4. The method of claim 3 wherein the power consumption indication comprises a ratio of average actual power consumption to a power consumption if the mobile device remained in the high activity state throughout the burst interval duration.

5. The method of claim 4 where the average power consumption for the burst transmission is determined by $$P_{avg} = \frac{\left(\begin{array}{c} P_{high-state}D_{high-state} + \\ P_{low-state}D_{low-state} + P_{idle-state}D_{idle-state} \end{array}\right)}{D_{int}},$$

where
   $P_{high-state}$, $P_{low-state}$, and $P_{idle-state}$ are average power consumptions when the mobile device is in the high activity state, the low activity state, and the idle state, respectively, and
   $D_{high-state}$, $D_{low-state}$, and $D_{idle-state}$ are the durations the mobile device is in the high activity state, the low activity state, and the idle state, respectively; and
   wherein the relative power is determined by $$P_{rel} = \frac{P_{avg}}{P_{high}}.$$

6. The method of claim 5 where the relative power is alternatively determined by $$P_{rel} = P_{rel-max} - \left(\frac{D_{idle-state}}{D_{idle}}\right)(P_{rel-max} - P_{rel-min}),$$

where
   $D_{idle}$ is a duration of a portion of each burst transmission in which data is not being transferred; and
   $P_{rel-max}$ is a relative average power consumption for $$\frac{D_{idle-state}}{D_{idle}} = 0,$$

and
   $P_{rel-min}$ is a relative average power consumption as $$\frac{D_{idle-state}}{D_{idle}}$$

approaches 1.

7. The method of claim 1 wherein the media input parameter comprises a media bitrate.

8. The method of claim 1 wherein the network input parameter comprises a bitrate of a link between the network and the mobile device.

9. The method of claim 1 wherein the per-state mobile device power consumption input parameter comprises an average power consumption for each state.

10. The method of claim 1 wherein the control parameter comprises a ratio of a duration the mobile device is in the idle state during a burst transmission to a duration of a portion of the burst transmission in which data is not being transferred to the mobile device from the network.

11. The method of claim 1 wherein the non-linear equation applied to the input parameters is $$\frac{D_{idle-state}}{D_{idle}} = \frac{K-1}{K};$$

where
- $D_{idle-state}$ is a duration the mobile device spends in the idle state during each burst transmission;
- $D_{idle}$ is a duration of a portion of each burst transmission in which data is not being transferred; and
- K is a constant such that $D_{idle}=K(D_{t1}+D_{t2})$; where
- $D_{t1}$ is a delay from end of burst transmission data transfer to exit of the high activity state; and
- $D_{t2}$ is a minimum delay for transition from the low activity state to the idle state.

12. The method of claim 1 wherein the non-linear equation applied to the input parameters is $$\frac{D_{idle-state}}{D_{int}} = \frac{K-1}{K}\left(1 - \frac{C_{media}}{C_{link}}\right);$$

where
- $D_{idle-state}$ is a duration the mobile device spends in the idle state during each burst transmission;
- $D_{int}$ is a burst interval duration from a beginning of each burst transmission to a beginning of a subsequent burst transmission;
- K is a constant such that $D_{idle}=K(D_{t1}+D_{t2})$; where
- $D_{idle}$ is a duration of a portion of each burst transmission in which data is not being transferred; and
- $D_{t1}$ is a delay from end of burst transmission data transfer to exit of the high activity state; and
- $D_{t2}$ is a minimum delay for transition from the low activity state to the idle state;
- $C_{media}$ is a media bitrate; and
- $C_{link}$ is a link bitrate.

13. The method of claim 1 wherein the non-linear equation applied to the input parameters is $$D_{int} = K(D_{t1}+D_{t2})\left(\frac{C_{link}}{C_{link}-C_{media}}\right);$$

where
- $D_{int}$ is a burst interval duration from a beginning of each burst transmission to a beginning of a subsequent burst transmission;
- K is a constant such that $D_{idle}=K(D_{t1}+D_{t2})$; where
- $D_{idle}$ is a duration of a portion of each burst transmission in which data is not being transferred; and
- $D_{t1}$ is a delay from end of burst transmission data transfer to exit of the high activity state; and
- $D_{t2}$ is a minimum delay for transition from the low activity state to the idle state;
- $C_{link}$ is a link bitrate; and
- $C_{media}$ is a media bitrate.

14. The method of claim 1 wherein the burst transmission comprises a plurality of data segments of predetermined size, and further comprising:
determining an integer number of data segments that sum to less than or equal to the calculated amount of data per burst transmission.

15. The method of claim 1 wherein the burst transmission comprises a plurality of data segments of predetermined size, and further comprising:
determining an integer number of data segments that sum to greater than the calculated amount of data per burst transmission; and
determining a first byte range of a last data segment required to equal the calculated amount of data per burst transmission.

16. The method of claim 15 further comprising:
determining a second byte range comprising the last data segment less the first byte range; and
wherein calculating an amount of data for a subsequent burst transmission comprises adding data segments to a second byte range.

17. The method of claim 1, wherein the control parameter is
$D_{idle-state}/D_{idle}$, where $D_{idle-state}$ is a duration the mobile device spends in the idle state during each burst transmission and $D_{idle}$ is a duration of a portion of each burst transmission in which data is not being transferred.

18. A mobile device operative to receive and render streaming media content from a wireless network, comprising:
a transceiver operative to receive media data in burst transmissions, each within a burst interval;
memory comprising a media buffer operative to store media data;
a controller operative to operate the mobile device in a high activity state during the burst transmission data transfer, a low activity state following the high activity state during which the mobile device may exchange control signaling with the network, and an idle state following the low activity state during which no signaling occurs, the controller operative to execute one or more functional modules operative to:
ascertain values of input parameters, wherein the input parameters include a media input parameter, a network input parameter, and a per-state mobile device power consumption input parameter;
select a value for a control parameter that is related to a proportion of time that the mobile device is in the idle state during a burst transmission;
calculate, by applying one or more non-linear equations associated with the control parameter to the input parameters, an output parameter using the value of the control parameter, wherein the output parameter includes an amount of data to download per burst transmission during the high activity state of the mobile device to maintain continuous playback of the streaming media;
evaluate the output parameter including to compare a value of the output parameter to a predetermined value or a predetermined range, or a relationship between values of the output parameter;
if the output parameter is acceptable, negotiate with the network to download the calculated amount of data per burst transmission during the high activity state of the mobile device to maintain the continuous playback of the streaming media; and
if the output parameter is not acceptable, alter the value of one or more input parameters or the control parameter, and repeat the calculation and evaluation.

19. The mobile device of claim 18 wherein the one or more functional modules executing on the controller are further operative to:
monitor the input parameters; and
if one or more input parameters change, repeat the calculation and evaluation.

20. The mobile device of claim 18 wherein the output parameter further includes a burst interval duration and a power consumption indication.

21. The mobile device of claim 20 wherein the power consumption indication comprises a ratio of average actual power consumption to a power consumption if the mobile device remained in the high activity state throughout the burst interval duration.

22. The mobile device of claim 21 where the average power consumption for the burst transmission is determined by $$P_{avg} = \frac{\left(\begin{array}{c}P_{high-state}D_{high-state} + \\ P_{low-state}D_{low-state} + P_{idle-state}D_{idle-state}\end{array}\right)}{D_{int}},$$

where
$P_{high-state}$, $P_{low-state}$, and $P_{idle-state}$ are average power consumptions when the mobile device is in the high activity state, the low activity state, and the idle state, respectively, and
$D_{high-state}$, $D_{low-state}$, and $D_{idle-state}$ are durations the mobile device is in the high activity state, the low activity state, and the idle state, respectively; and
wherein a relative power is determined by $$P_{rel} = \frac{P_{avg}}{P_{high}}.$$

23. The mobile device of claim 22 where the relative power is alternatively determined by $$P_{rel} = P_{rel-max} - \left(\frac{D_{idle-state}}{D_{idle}}\right)(P_{rel-max} - P_{rel-min}),$$

where
$D_{idle}$ is a duration of a portion of each burst transmission in which data is not being transferred; and
$P_{rel-max}$ is a relative average power consumption for $$\frac{D_{idle-state}}{D_{idle}} = 0,$$

and
$P_{rel-min}$ is a relative average power consumption as $$\frac{D_{idle-state}}{D_{idle}}$$

approaches 1.

24. The mobile device of claim 18 wherein the media input parameter comprises a media bitrate.

25. The mobile device of claim 18 wherein the network input parameter comprises a bitrate of a link between the network and the mobile device.

26. The mobile device of claim 18 wherein the per-state mobile device power consumption input parameter comprises an average power consumption for each state.

27. The mobile device of claim 18 wherein the control parameter comprises a ratio of a duration the mobile device is in the idle state during a burst transmission to a duration of a portion of the burst transmission in which data is not being transferred to the mobile device from the network.

28. The mobile device of claim 18 wherein the non-linear equation applied to the input parameters is $$\frac{D_{idle-state}}{D_{idle}} = \frac{K-1}{K};$$

where
$D_{idle-state}$ is a duration the mobile device spends in the idle state during each burst transmission;
$D_{idle}$ is a duration of a portion of each burst transmission in which data is not being transferred; and
K is a constant such that $D_{idle}=K(D_{t1}+D_{t2})$; where
$D_{t1}$ is a delay from end of burst transmission data transfer to exit of the high activity state; and
$D_{t2}$ is a minimum delay for transition from the low activity state to the idle state.

29. The mobile device of claim 18 wherein the non-linear equation applied to the input parameters is $$\frac{D_{idle-state}}{D_{int}} = \frac{K-1}{K}\left(1 - \frac{C_{media}}{C_{link}}\right);$$

where
$D_{idle-state}$ is a duration the mobile device spends in the idle state during each burst transmission;
$D_{int}$ is a burst interval duration from a beginning of each burst transmission to a beginning of a subsequent burst transmission;
K is a constant such that $D_{idle}=K(D_{t1}+D_{t2})$; where
$D_{idle}$ is a duration of a portion of each burst transmission in which data is not being transferred; and
$D_{t1}$ is a delay from end of burst transmission data transfer to exit of the high activity state; and
$D_{t2}$ is a minimum delay for transition from the low activity state to the idle state;
$C_{media}$ is a media bitrate; and
$C_{link}$ is a link bitrate.

30. The mobile device of claim 18 wherein the non-linear equation applied to the input parameters is $$D_{int} = K(D_{t1} + D_{t2})\left(\frac{C_{link}}{C_{link} - C_{media}}\right);$$

where
$D_{int}$ is a burst interval duration from a beginning of each burst transmission to the beginning of the subsequent burst transmission;
K is a constant such that $D_{idle} K(D_{t1}+D_{t2})$; where
$D_{idle}$ is a duration of a portion of each burst transmission in which data is not being transferred; and
$D_{t1}$ is a delay from end of burst transmission data transfer to exit of the high activity state; and
$D_{t2}$ is a minimum delay for transition from the low activity state to the idle state;
$C_{link}$ is a link bitrate; and
$C_{media}$ is a media bitrate.

31. The mobile device of claim 18, wherein the control parameter is:

$$\frac{D_{idle\text{-}state}}{D_{idle}},$$

where $D_{idle\text{-}state}$ is a duration the mobile device spends in the idle state during each burst transmission and $D_{idle}$ is a duration of a portion of each burst transmission in which data is not being transferred.

* * * * *